United States Patent [19]

Stettner et al.

[11] 3,761,912

[45] Sept. 25, 1973

[54] BURGLAR DETERRENT TIMING SWITCH

[75] Inventors: Joseph C. Stettner; James H. Ott, both of Akron, Ohio

[73] Assignee: Novar Electronics Corporation, Barberton, Ohio

[22] Filed: May 20, 1971

[21] Appl. No.: 145,134

[52] U.S. Cl. ......... 340/276, 307/252 B, 340/258 B, 340/309.1

[51] Int. Cl. ...................... G08b 13/16, H03k 17/56

[58] Field of Search ................ 340/258 B, 258, 276, 340/148, 309.1, 258 D, 261, 331; 307/252 B, 252 W, 117

[56] References Cited

UNITED STATES PATENTS

| | | | |
|---|---|---|---|
| 3,582,671 | 6/1971 | Ott | 340/148 X |
| 3,550,111 | 12/1970 | Ervin | 340/309.1 X |
| 3,599,195 | 8/1971 | Boyko | 340/390.1 X |
| 3,049,699 | 8/1962 | Larrick | 340/261 |
| 3,631,318 | 12/1971 | Hubbard | 340/331 X |
| 3,475,751 | 10/1969 | Sontag et al. | 340/276 X |
| 3,530,432 | 9/1970 | Pope | 340/309.1 X |
| 3,579,187 | 5/1971 | Knott | 340/261 X |
| 3,619,656 | 11/1971 | Domke | 307/252 B X |
| 3,421,027 | 1/1969 | Maynard et al. | 307/252 B X |
| 3,638,043 | 1/1972 | Laupman | 307/252 B |
| 3,459,961 | 8/1969 | Ravas | 307/252 B |

*Primary Examiner*—John W. Caldwell
*Assistant Examiner*—Scott F. Partridge
*Attorney*—Frank H. Foster

[57] ABSTRACT

A burglar deterrent switch for installation in a conventional manual switch box for controlling room lights. An electronic sound responsive timing switch illuminates the room lights for a selected period of time in response to the occurrence of a sound and then turns the lights off for another selected period of time. The timing switch has a triac which is shunted across the manual light switch. The gate of the triac is controlled by an SCR connected in a bridge rectifier for controlling the triac gate current. The gate of the SCR is connected to the output of an amplifier and is switched on by sound incident upon a sound transducer connected to the input of the amplifier. A timing circuit means is also connected across the SCR and comprises a pair of voltage reference diodes connected parallel to a capacitance for fixing the voltage to which the capacitance may charge and having a resistance series connected to the parallel diodes and capacitance.

14 Claims, 2 Drawing Figures

INVENTORS
JOSESPH C. STETTNER
JAMES H. OTT
BY
Cennamo Kremblas & Foster
ATTORNEY

BURGLAR DETERRENT TIMING SWITCH

BACKGROUND OF THE INVENTION

This invention relates to a timing switch, and more particularly relates to a timing switch used to control a room illumination means by sound incident upon a sound transducer to provide an improved burglar deterrent.

Man has for years sought to protect himself from burglars by use of many types of machines. Numerous electrical and electronic circuits have been disclosed for use in providing warnings relating to burglars, fire, and other dangerous situations. Such circuits have seen various degrees of success.

Prior circuits have not come into wide use because they are ordinarily very complex and expensive; and worse yet, require extensive installation. For example, most protective systems require a great deal of new wiring in the room to be protected. Protecting the alarm device itself from attack and defeat by a burglar is also a problem. There is, therefore, a need for a device which is relatively simple and inexpensive, and incapable of being defeated. More importantly, there is a need for a device which may be very quickly and easily installed in an existing structure without the necessity of any significant change in or addition to the structure.

Conventional alarm systems sound an alarm to the police or nearby persons but unfortunately often permit the burglar to cause damage before the police are able to arrive. What is needed, therefore, is a device which will deter the burglar from carrying out his crime. More particularly, what is needed is a device which will scare the burglar and cause him to flee while at the same time providing an indication that the premises is being burglarized.

We have found for this purpose that it is desirable to have the actions of the burglar cause the lighting of the room in which he is located to be illuminated. More particularly, it is desirable that the room be steadily illuminated for a given period of time. This will cause the burglar to believe that his presence has been detected and that someone turned on the lights and is present to pursue him. With the room so illuminated, the police or neighbors may easily see that a person is occupying the room at a time when no one but a burglar would be.

SUMMARY OF THE INVENTION

The invention is an electronic timing switch for controlling the power supplied to a load connected to the switch and to a source of electrical power in response to an input actuating signa. The switch comprises a first electronic switch, such as a triac, and a second electronic switch, such as a SCR, in the gate circuit of the first electronic switch. The second electronic switch is connected to a gate current source for switching the gate current of the first electronic switch. A coupling circuit is connected to the gate of the second electronic switch for coupling an input actuating signal to the gate of the second electronic switch. A timing circuit means is connected across the main terminals of the second electronic switch for controlling the operation of the first electronic switch and for providing a voltage to selectively enable and disable coupling means. This timing circuit means comprises a plurality of series connected voltage reference diodes connected parallel to a capacitance and having a resistance series connected to the parallel connected capacitance and diodes. The enabling-disabling voltage appears across one of the diodes and is used for selectively enabling and disabling the coupling means.

To provide a burglar deterrent, the electronic timing switch has an audio transducer connected to the input of its coupling means for operating the switch and an illumination means, such as room lighting, connected to a source of power and to the electronic timing switch.

It is therefore an object of the invention to provide a burglar deterrent switch which may be very quickly and easily connected to the conventional manual switch of a room illumination means.

Another object of the invention is to provide a burglar deterrent circuit which is simple and which permits the use of inexpensive components.

Another object of the invention is to provide a burglar deterrent which, after the occurrence of a suitable sound, will turn on room lights for a selected period of time and then hold the lights off for another selected period of time, regardless of what occurs in the intervening period.

Another object of the invention is to provide a timing switch in which the variation of the electrical parameters of the circuit components with age will not effect circuit operation because these values are not critical.

Another object of the invention is to provide an electrical timing switch which will retain its selected timing periods regardless of any variation in the power supply voltage to the load being controlled.

Another object of the invention is to provide an alarm system capable of sounding an audible alarm in response to sound produced by a burglar but which nonetheless does not have a positive feedback loop so that the circuit will cease operating if it is falsely actuated.

Another object of the invention is to provide a timing circuit which may be used with conventional commercial or dwelling power sources having peak voltages in excess of 150 volts while permitting the use of timing capacitors having maximum voltage ratings of considerably less.

Further objects and features of the invention will be apparent from the following specification and claims when considered in connection with the accompanying drawings illustrating the preferred embodiments of the invention.

Figure 1:
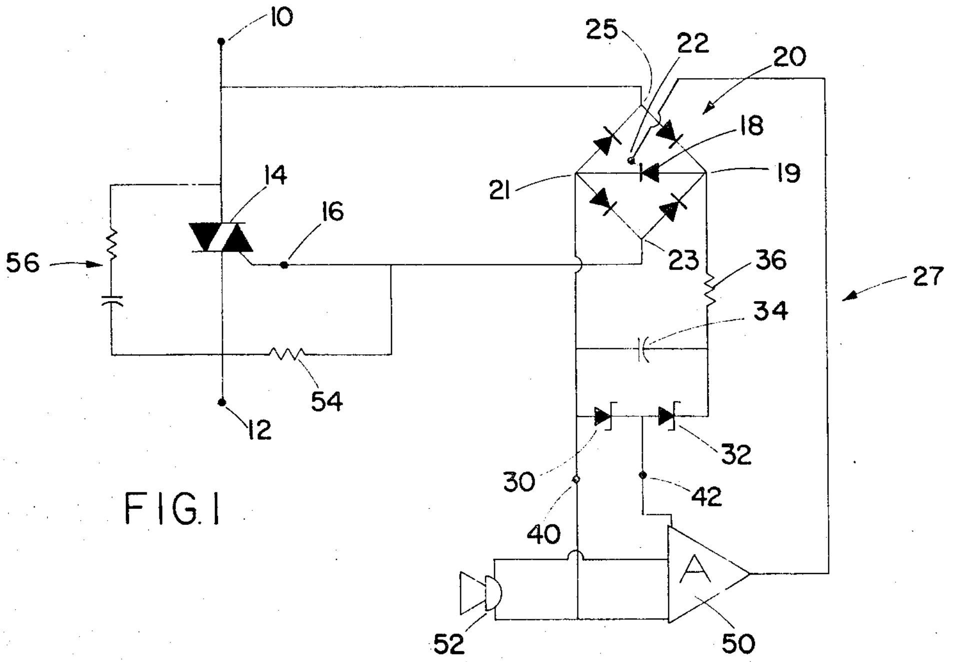
FIG. 1 is a schematic diagram showing a simplified version of the preferred embodiment of the invention for purposes of explaining the operation of the invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose. For example, when the term "connected" is used, this does not necessarily mean directly connected. Rather, it includes connection of one terminal to another through other elements which may be known to persons skilled in the art. As a further example, the term "electronic switch" is often used and refers to items commonly used in the electronic art for switching. For example, this may include thyristors, transistors, both bi-polar and field effect, and other types, and may also include electromechanical switches such as reed switches or relays.

DETAILED DESCRIPTION

FIG. 1 shows an electronic timing switch for controlling the power applied to a load which is connected to the switch and to a source of electrical power. The switch terminals for controlling the power in the load are the terminals 10 and 12. Connected between the terminals 10 and 12 is a triac 14 functioning as a first electronic switch. This first electronic switch switches the current in the load which is connected either to the terminal 10 or to the terminal 12. The triac 14 has a control gate 16. An SCR 18 which functions as a second electronic switch is connected in the gate circuit of the triac 14 and is connected to a source of gate current for switching the gate current to the triac 14. The SCR 18 has its main terminals connected to the opposite uni-directional nodes 19 and 21 of a bridge rectifier 20 in a direction to at times permit substantial current flow between the uni-directional nodes. The bi-directional nodes 23 and 25 of the bridge rectifier 20 are connected between the gate of the triac 14 and a main terminal of the triac, such as the terminal 10.

A coupling circuit means, such as an amplifier 50, is connected to the gate 22 of the SCR 18 for coupling an input actuating signal to the gate of the SCR 18 in order to control the SCR 18. Thus, the combination of the bridge rectifier 20 and the SCR 18 is primarily a switch for controlling gate current to the triac 14.

A timing circuit means 27 is connected across the main terminals of the SCR 18. The purpose of the timing circuits means is to control the operation of the SCR 18 and thereby control the operation of the triac 14. The timing circuit 27 also functions to provide a voltage to selectively enable and disable the amplifier 50 which couples the input actuating signal to the gate of the SCR 18.

The timing circuit has a pair of series connected voltage reference diodes 30 and 32 which are parallel connected to a capacitance 34. A resistance 36 is series connected to the parallel connected capacitance and series diodes. A voltage will occur across one of the diodes, in this case the diode 30 at the terminals 40 and 42, for at times enabling and disabling the amplifier 50.

The preferred coupling means is the audio amplifier 50 having its input connected to a sound transducer 52, having its audio output connected to the gate 22 of the SCR 18 and deriving its biasing power supply from the voltage across the zener diode 30.

The amplifier 50 and the transducer 52 are advantageously designed to selectively filter certain audio frequencies and to prefer others. The coupling capacitors of the amplifier 50 are selected to filter out frequencies below 500 Hz. Because building walls filter out frequencies above 500 hz, the burglar deterrent switch, with the frequency selective coupling capacitors, effectively is insensitive to outside noises. The microphone 52 preferably has a resonant frequency response peak around 7.5 KHz because these frequencies are reflected around rooms with relatively little attenuation. Therefore the switch is made particularly sensitive to noises orginating anywhere in a building. Line of sight sensitively is thereby eliminated. It is desirable to have a resistance 54 which is connected between the gate 16 of the triac 14 and the terminal of the triac 14 to which the bridge 20 is not connected. The purpose of the resistance 54, which might for example be 47 ohms, is to prevent any leakage current or any dc-quiescent biasing current to the amplifier 50 from flowing through the gate 16 of the triac 14, thereby turning on the triac 14. A transient suppressing series resistance and capacitance 56 may be connected across the main terminals of the triac 14 for the conventional purpose of preventing an inductive load which demands high current and duty cycle from turning on the triac 14. However, with other loads, its use is avoided. When uses, its capacitance should not be acoustically coupled to the microphone.

The operation of the simplified circuit illustrated in FIG. 1 would begin with terminals 10 and 12 series connected with a load and to a source of power. We may begin with the assumption that no sound is present at the sound transducer 52. In this condition, the capacitor 34 of the timing circuit 27 has charged to a voltage equal to the sum of the zener voltages of the diodes 30 and 32. For example, if the zener voltage of the diode 30 is 7.5 volts and the zener voltage of the diode 32 is 36 volts, then the capacitor 34 will be charged to the voltage of 43.5 volts. Thus, an electrolytic capacitor rated at 50 volts maximum may be used. Because no audio signal is present at the transducer 52, the gate 22 of the SCR 18 will be at zero volts and consequently there will be not gate current and the SCR 18 will be non-conducting. The bridge arrangement is such that, in this condition the gate current through the gate 16 of the triac 14 is insufficient for triggering and yet charging current can flow to properly charge the capacitance 34 to a voltage of, for example, 43.5 volts in the desired polarity.

At the instant sound strikes the transducer 52, the amplifier audio signal will be applied to the gate 22 of the SCR 18. This will immediately trigger the SCR 18 to permit current flow through the gate 16 of the triac 14 and turn the triac 14 to an "on" state. Once the SCR 18 has fired, the voltage of the capacitance 34 will maintain the voltage on the SCR 18 at the proper polarity and maintain current above the minimum holding current to keep the SCR 18 in a conducting state until the capacitance 34 has discharged to a voltage which can not maintain the minimum holding current. Thus, the SCR 18 continues to conduct and current flows through the load so long as there is a sufficient charge on the capacitance 34 regardless of whether sound continues to be present at the transducer 52.

As soon as the capacitance 34 begins its discharge, its voltage will fall below the total zener voltage of the diodes 30 and 32. At this point, the diode 30 ceases conducting. Further reduction of the voltage applied across the zener diodes results in voltage reduction across the terminals 40 and 42. When the voltage across the zener diodes is reduced to the zener voltage of the diode 32, the voltage at the terminals 40 and 42 reaches zero and further drop causes the diode 32 to cease conducting. Thus, during the discharge of the capacitance 34, the diode 32 will become non-conducting, thereby depriving the amplifier 50 of its bias current. In doing so, the amplifier 50 is disabled from further amplifying any sound signal from the transducer 52. Current will therefore continue to flow between the terminals 10 and 12 during the discharge of capacitor 34.

When the capacitor 34 has discharged sufficiently, the SCR 18 will go to its "off" state. This of course is a necessity because its gate 22 can receive no signal from the amplifier 50 so long as no bias power voltage is applied at the terminals 40 and 42 to the amplifier 50. When the SCR ceases conducting, the triac 14 will likewise go to its "off" state as soon as the AC voltage at its terminals 10 and 12 passes through zero.

When the SCR 18 stops conducting, the capacitance 34 will begin to recharge toward the total zener voltage of the diodes 30 and 32. The recharge will be the reverse of events during charging. During most of the time period of this charging, the zener diodes 30 and 32 will be held off. In particular, the zener voltage of the diode 32, which has a zener voltage considerably higher, preferably, than the diode 30, can not be reached until the capacitance 34 is nearly fully charged. Thus, during most of the recharging of the capacitance 34, the zener diode 32 will not conduct current and therefore the amplifier 50 will be completely disabled from applying a signal to the gate 22 of the SCR 18. Thus, for this selected time period during recharging of the capacitor 34, regardless of any audio signals occurring at the transducer 52, no current can flow between the terminals 10 and 12 of the triac 14. If a sound alarm is included in the load which is switched by the triac 14, this disabling means that the sound alarm will be turned off before the amplifier 50 is again enabled to couple a signal to the gate 22 of the SCR 18. The possibility of positive feedback in which the circuit would actuate itself is completely eliminated. If the circuit is ever falsely actuated, it will be deactuated after a selected period of time and then again enabled and poised ready for a new actuation.

Eventually the capacitance 34 will be fully charged and biasing power will again be applied to the amplifier 50. Thus, the circuit, after the capacitance 34 is charged, will be enabled again so that another occurrence of a sound will cause a repetition of the above operation.

Figure 2:
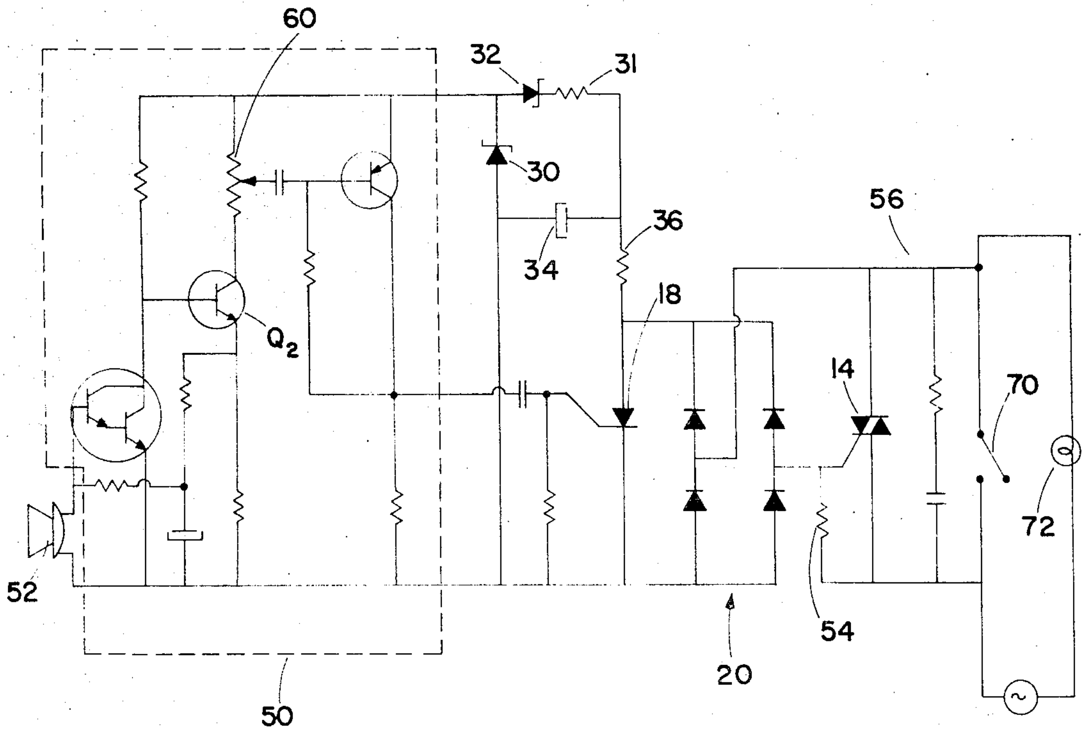
FIG. 2 is a schematic diagram of the preferred embodiment of the invention.

FIG. 2 shows more detail of the circuit. The amplifier 50 is seen to comprise active transistor amplifier RC coupled to the SCR 18. A potentiometer 60 is connected to the output circuit of the transistor $Q_2$ in order to permit adjustment of the sensitivity of the amplifier, and therefore the switch, between the range from complete zero sensitivity with the wiper at its position farthest from the collector of the transistor $Q_2$ to a very high sensitivity position at the end of the potentiometer nearest the collector of the transistor $Q_2$. A resistor 31 is added in series with the zener diode 32. This permits clamping of the amplifier bias voltage at the zener voltage of the diode 30 for good regulation. Ripple or drift voltage will be dropped across the resistance 31 of the series connected zener diodes 30 and 32 and the resistance 31. Of course, in the circuit of FIG. 2 with resistance 31 added, the maximum voltage to which the capacitor 34 will charge will equal the sum of the zener voltages of the diodes 30 and 32 and the IR drop across the resistance 31.

Among the many advantages of the circuit is the fact that an inexpensive triac may be used. This is true because there is no substantial impedance in the trigger circuit of the triac. Therefore, the gate current of the triac will increase very rapidly when the SCR 18 is turned on until the triac fires. There is no timing or phasing circuit in the gate circuit of the triac 14. For this same reason, aging and heat will have little effect on the circuit's operation because circuit values are not critical. In addition, the zener diodes 30 and 32, when connected in our circuit, not only provide the enabling and disabling operations described above but in addition provide a well regulated power supply for the amplifier 50.

The advantages of our invention can be more greatly appreciated if one recalls that an intruder always makes a sound. His biggest enemy is light. Our invention provides a way for the lights of an established building to respond by flashing on and then off to every sound and every move an intruder makes. If the doorknob rattles or glass breaks, or even if a pin drops, the light in the room will flash on and off to frighten the intruder and signal his presence.

With a conventional manual light switch 70 connected parallel to the triac 14, the circuit is automatically activated when the manual light switch 70 is turned to the off position. Obviously, when the manual switch is turned to the on position, the triac will be nonconducting and the entire circuit will be in an unenergized state. Thus, a person leaving the premises merely flicks the manual switch 70 to turn off the lights 72 and the circuit is thus ready for operation. An intruder, upon making a sound, will find that the lights flash on, for example, for 5 seconds, then turns off, for example for 2 seconds, to await the next move of the intruder. He is startled into an awareness that his presence will be detected and it is made obvious to him that every move he makes will be signaled to the outside.

A guard or watchman can actuate the circuit by making the proper sound and thereby can observe for the 5 seconds anything which might be going on in the room. In this manner, rooms can be constantly under surveillance without the necessity of the continuing consumption of power by lighting equipment. A tap on the door, wall, or window, or a snap of the fingers, will actuate the lights and thereby eliminate fumbling for a light switch. If an intruder turns a doorknob or rattles a window, a circuit responds to these sounds with a five second flash of light and then waits two seconds for the intruder to continue. If he leaves without entering, no crime has been committed and the circuit has not set off a false alarm. However, should the intruder continue his attempt to enter, the circuit then signals his every move with five second flashes.

It is to be understood that while the detailed drawings and specific examples given describe a preferred embodiment of our invention, they are for the purposes of illustration only, that the apparatus of the invention is not limited to the precise details and conditions disclosed, and that various changes may be made therein without departing from the spirit of the invention which is defined by the following claims.

I claim:

1. An electronic timing switch for controlling the power applied to a load which is connected to said switch and to a source of electrical power, in response to a non-periodic input actuating signal, said switch comprising:

a. a first electronic switch for switching the current in said load, the first electronic switch having a control gate;

b. a second electronic switch in the gate circuit of the first electronic switch connected to a source of gate current for switching the gate current of said first electronic switch, the second electronic switch having a control gate;
c. a coupling circuit means for coupling an externally generated, non-periodic input actuating signal to the gate of said second electronic switch;
d. timing circuit means connected across the main terminals of said second electronic switch for controlling the operation of the first electronic switch and for providing a voltage to selectively enable and disable the coupling means, the timing circuit means comprising a plurality of series connected voltage reference diodes connected parallel to a capacitance and having a resistance series connected to said parallel connected capacitance and series diodes, said enabling-disabling voltage occurring across one of said voltage reference diodes and said coupling means connected across said one diode for being selectively enabled and disabled.

2. A switch according to claim 1 wherein:
a. a bridge rectifier is connected at its opposite bi-directional nodes, between the gate of said first electronic switch and a main terminal of said electronic switch; and
b. said second electronic switch is connected between the opposite uni-directional nodes of said bridge rectifier.

3. A switch according to claim 1 wherein: said coupling circuit means is an amplifier for receiving and amplifying said input actuating signal, and the bias power supply for said amplifier is at the terminals on opposite sides of said one voltage reference diode.

4. A switch according to claim 3 wherein:
a. A resistance is connected between the gate of said first electronic switch and the other main terminal of the first electronic switch;
b. a bridge rectifier is connected, at its opposite uni-directional nodes, between the gate of said first electronic switch and main terminal of said first electronic switch; and
c. said second electronic switch is connected between the opposite uni-directional nodes of said bridge rectifier.

5. An electronic timing switch for controlling the power applied to a load which is connected to said switch and to a source of electrical power, in response to an input actuating signal, said switch comprising:
a. a triac, the main terminals of which are the switch terminals, for switching the current in said load;
b. a bridge rectifier connected at its opposite bi-directional nodes between the gate of said triac and a main terminal of the triac for switching the gate current of the triac;
c. an SCR having its main terminals connected to the opposite uni-directional nodes of said bridge rectifier in a di-rection to, at times, permit substantial current flow between said uni-directional nodes;
d. an amplifier means having its output connected to the gate of said SR for firing said SCR in response to the presence of said input actuating signal at the input of said amplifier;
e. a timing circuit means connected across said SCR and comprising a plurality of series connected, similarly polarized voltage reference diodes parallel connected to a capacitance for fixing the voltage to which the capacitance may charge, and having a resistance series connected to said parallel connected diodes and capacitance, the total zener voltage of said diodes being less than the peak, instantaneous voltage across the SCR, the biasing supply terminals of said amplifier being connected across one of said voltage reference diodes for supplying power to said amplifier.

6. A switch according to claim 5 wherein:
a resistance is connected between the gate of said triac and the other main terminal of the triac and has a value substantially less than the off-state impedance of the gate of the triac.

7. A switch according to claim 6 wherein:
a pair of zener diodes are used and the zener voltage of said one diode is equal to the desired amplifier power supply voltage and the zener voltage of the other diode is substantially greater.

8. A switch according to claim 7 wherein:
The product of the value of said resistance in ohms and said capacitance in farads is of the same order of magnitude as the on and the off periods of said switch.

9. A switch according to claim 8 wherein:
said resistance is approximately $22 \times 10^3$ ohms, said one zener voltage is approximately 7.5 volts and the other zener voltage is approximately 37 volts.

10. A switch according to claim 5 wherein:
a mechanical switch, for manual switching, is connected parallel to said triac.

11. A switch according to claim 5 wherein a sound transducer is connected to the input of said amplifier means.

12. A switch according to claim 5 wherein:
a resistance is connected between the gate of said triac and the other main terminal of the triac and has a value substantially less than the off-state impedance of the gate of the triac.

13. A switch according to claim 6 wherein: a pair of zener diodes are used and the zener voltage of said one diode is equal to the desired amplifier power supply voltage and the zener voltage of the other diode is substantially greater.

14. A burglar deterrent comprising:
1. an electrically powered illumination means for being illuminated in response to sound; and
2. an electronic timing switch connected to said illumination means and a source of power for switching the current in said illumination means to illuminate said illumination means for a selected period of time in response to a sufficient sound and then for subsequently blocking the current through the illumination means for another selected period of time wherein: said timing switch comprises
a. a triac, the main terminal of which are the switch terminals, for switching the current in said load;
b. a bridge rectifier connected at its opposite bi-directional nodes between the gate of said triac and the main terminals of the triac for switching the gate current of the triac;
c. an SCR having its main terminals connected to the opposite uni-directional nodes of said bridge rectifier in a direction to, at times, permit substantial current flow between said uni-directional nodes;
d. an amplifier means having its output connected to the gate of said SCR for firing said SCR in response to the presence of said input actuating signal at the input of said amplifier;

e. a timing circuit means connected across said SCR and comprising a plurality of series connected, similarly polarized voltage reference diodes parallel connected to a capacitance for fixing the voltage to which the capacitance may charge, and having a resistance series connected to said parallel connected diodes and capacitance the total zener voltage of said diodes being less than the peak, instantaneous voltage across the SCR, the biasing supply terminals of said amplifier being connected across one of said voltage reference diodes for supplying power to said amplifier; and f. a sound transducer connected to the input of said amplifier.

* * * * *